C. HOFMANN.
CHANGE MAKING MACHINE.
APPLICATION FILED MAY 21, 1913.

1,136,801.

Patented Apr. 20, 1915.
3 SHEETS—SHEET 3.

WITNESSES

INVENTOR
George Hofmann
BY
ATTORNEYS

G. HOFMANN.
CHANGE MAKING MACHINE.
APPLICATION FILED MAY 21, 1913.

1,136,801.

Patented Apr. 20, 1915.
8 SHEETS—SHEET 1.

Fig.1.

WITNESSES

INVENTOR
George Hofmann
BY
ATTORNEYS

G. HOFMANN.
CHANGE MAKING MACHINE.
APPLICATION FILED MAY 21, 1913.

1,136,801.

Patented Apr. 20, 1915.
8 SHEETS—SHEET 6.

WITNESSES

INVENTOR
George Hofmann
BY
ATTORNEYS

G. HOFMANN.
CHANGE MAKING MACHINE.
APPLICATION FILED MAY 21, 1913.

1,136,801.

Patented Apr. 20, 1915.
8 SHEETS—SHEET 7.

WITNESSES

INVENTOR
George Hofmann
BY
ATTORNEYS

G. HOFMANN.
CHANGE MAKING MACHINE.
APPLICATION FILED MAY 21, 1913.

1,136,801.  Patented Apr. 20, 1915.
8 SHEETS—SHEET 8.

WITNESSES

INVENTOR
George Hofmann
BY
ATTORNEYS

UNITED STATES PATENT OFFICE.

GEORGE HOFMANN, OF LYONS, IOWA, ASSIGNOR OF ONE-HALF TO ROBERT HOLDING, OF LYONS, IOWA.

CHANGE-MAKING MACHINE.

1,136,801.  Specification of Letters Patent.  Patented Apr. 20, 1915.

Application filed May 21, 1913. Serial No. 768,946.

*To all whom it may concern:*

Be it known that I, GEORGE HOFMANN, a citizen of the United States, and a resident of Lyons, in the county of Clinton and State of Iowa, have invented a new and Improved Change-Making Machine, of which the following is a full, clear, and exact description.

The invention relates to change-making machines having tubes for containing coins of different denominations, and means for delivering the coins from one or more tubes by means of keys.

The object of the invention is to provide a new and improved change-making machine for use by cashiers and other persons for quickly and accurately making change either with or without pennies.

In order to accomplish the desired result use is made of a series of coin magazines for containing stacks of coins of different denominations, coin slides for receiving the lowermost coins from the said stacks of coins, one or two sets of setting keys for setting the said coin slides according to the change to be made, and an ejecting key for moving the set coin slides to eject coins from under the stack of coins.

A practical embodiment of the invention is represented in the accompanying drawings forming a part of this specification, in which similar characters of reference indicate corresponding parts in all the views.

Fig. 8 is a similar view of the same with the parts in different position.

The casing A of the change-making machine is preferably mounted on a suitably constructed base B provided with a change-receiving tray or chute B' flanked by drawers B² for containing tools or other articles. On top of the casing A is arranged a series of coin magazines C, C', C², C³, and C⁴, preferably in the form of glass tubes of a size for containing stacks of coins such as half dollars, quarter dollars, dimes, nickels and pennies, respectively, it being understood, however, that in machines used in countries having a money standard different from that of the United States it is necessary to change the size of the coin magazines to suit the different coin denominations, such as marks, pfennigs, francs, centimes, shillings, pence and farthings.

The coins are filled into the coin magazines C, C', C², C³ and C⁴ at their upper open ends, but, if desired, the coins may be fed into the upper ends of the coin magazines by the use of spurious coin detectors D attached to a plate D' hinged to an apertured support E through which extend the upper ends of the coin magazines C, C', C², C³ and C⁴. The support E is held on posts E' erected on the cover A' of the casing A. Each spurious coin detector D is preferably in the form of an angular chute having an opening of a size corresponding to the respective coin, and the bottom of the forward angular portion of each chute is provided with a slot somewhat narrower than the opening of the chute, so that a coin which is not of the proper thickness and which is introduced into the detector D drops out of the slot and does not pass into the upper open end of the coin magazine C, C', C,² C³ or C⁴. By the arrangement described the coin magazines are filled with coins of the proper thickness to prevent making wrong change by moving more coins out from under a coin magazine than should be moved.

Directly under the cover A' and the coin magazines C, C', C², C³ and C⁴ are arranged coin slides F, G, H, I and J mounted to slide transversely in suitable guideways arranged on a plate A² attached to the casing A at the top thereof directly under the cover A'. The rearward movement of the coin slides F, G, H, I and J is controlled by a series of setting levers K, K', K², K³ and K⁴, and the rearward movement of the coin slides F, G, H and I is also controlled by a second set of keys L, L', L² and L³, and the return or forward movement of the coin slides F, G, H, I and J is controlled by an ejecting lever N. The several keys K, K', K², K³ and K⁴, L, L', L² and L³, and N project beyond the front face of the casing A so as to readily be under the control of the cashier or other person making the change.

Figure 1:
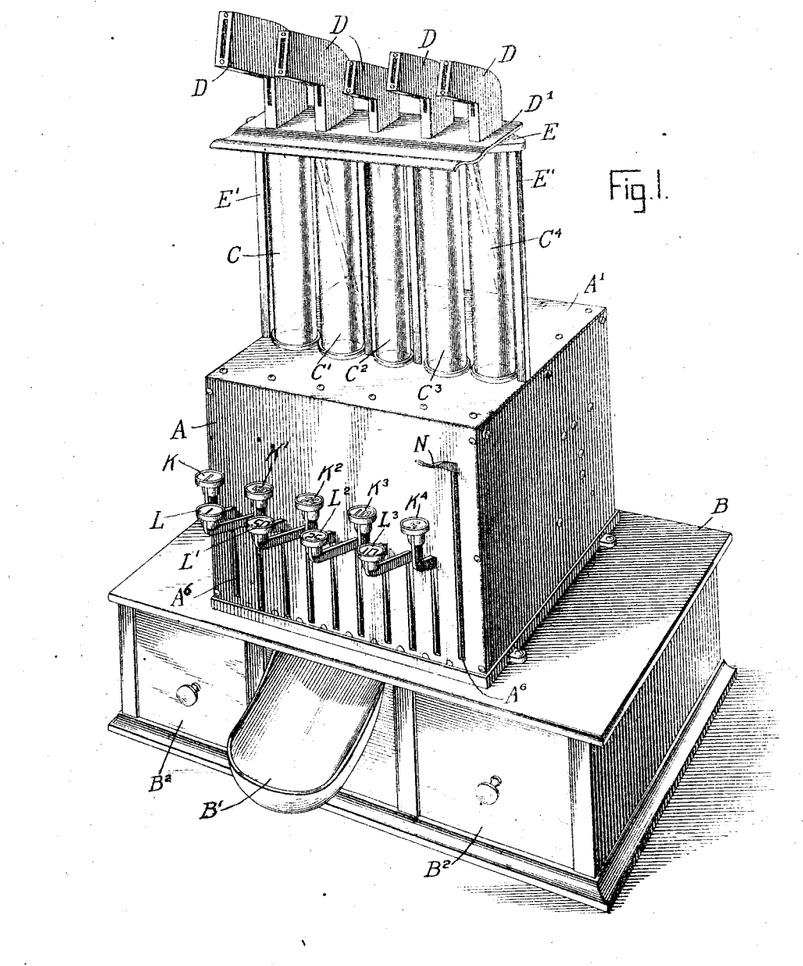
Figure 1 is a perspective view of the change-making machine.
Figure 2:
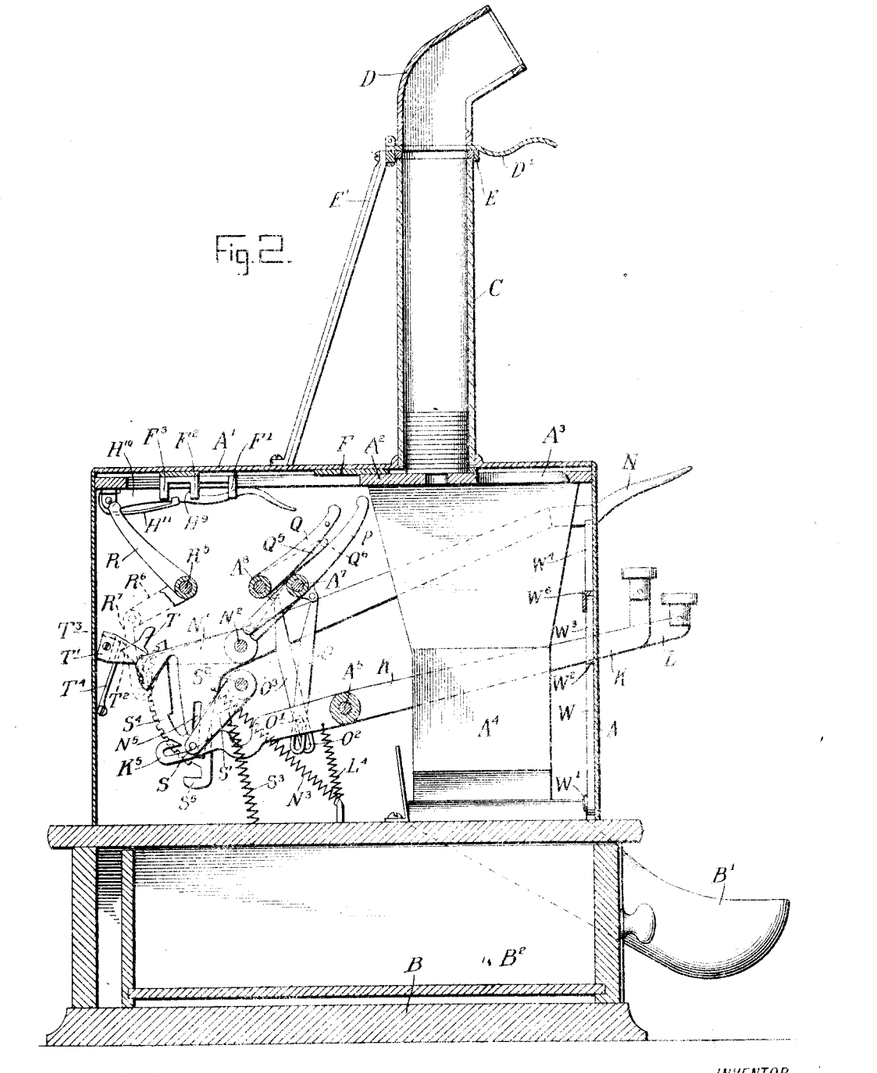
Fig. 2 is an enlarged transverse section of the same.

The outer ends of the setting keys K, K', K², K³ and L, L', L², L³, are provided with finger pieces having corresponding coin values arranged thereon, as plainly indicated in Fig. 1, that is, the keys K and L are marked $1.00, the keys K', L' are marked 50 cents, and the keys K², L² are marked 25 cents, the keys K³ and L³ are marked 10 cents, and the key K⁴ is marked 5 cents, thus indicating that whatever key is pressed the legend thereon indicates the amount of change to be made.

The coin slides F, G, H, I and J during their forward movement push the lowermost coins in the coin magazines out of the same and into the openings A³ formed in the plate A², the pushed-out coins dropping into a gathering chute A⁴ secured to the under side of the plate A² and leading to the coin-receiving tray B' projecting at the front of the base B to permit the convenient removal of the change.

The keys are connected with the coin slides F, G, H, I and J in such a manner that when the $1.00 key K is pressed all the slides F, G, H, I and J are set for making change of one dollar in 1 half-dollar, 1 quarter-dollar, 1 dime, 2 nickels and 5 pennies, and when the $1.00 key L is pressed the slides F, G, H and I are set for making change for one dollar in 1 half-dollar, 1 quarter-dollar, 2 dimes and 1 nickel. When the 50 cents key K' is pressed, the coin slides G, H, I and J are set for making change for 50 cents in 1 quarter-dollar, 1 dime, 2 nickels and 5 pennies, and when the 50 cents key L' is pressed the coin slides G, H and I are set for making change for 50 cents in 1 quarter-dollar, 2 dimes and 1 nickel. When the 25 cents key K² is pressed the coin slides H, I and J are set for making change for 25 cents in 1 dime, 2 nickels and 5 pennies, and when the 25 cents key L² is pressed the coin slides H and I are set for making change for 25 cents in 2 dimes and 1 nickel. When the 10 cents key K³ is pressed the coin slides I and J are set for making change for 10 cents in 1 nickel and 5 pennies, and when the 10 cents key L³ is pressed the coin slide I is set for making change for 10 cents in 2 nickels. When the 5 cents key K⁴ is pressed the coin slide J is set for making change in 5 pennies.

The set coin slides are moved forward on the operator pressing the ejecting key N, and during this return movement the set coin slides deliver the correct change. Thus the pressing and releasing of a setting key and the pressing and releasing of the ejecting key N constitutes a complete operation. The coin slide F delivers at each operation thereof a half-dollar, and the coin slide G a quarter-dollar. The coin slide H delivers at each operation a single dime when the keys K, K' and K² are used for setting purposes, and 2 dimes when the keys L, L' and L² are used for setting purposes. The coin slide I delivers at each operation a single nickel when the keys L, L', L² and K³ are used for setting purposes, and 2 nickels when the keys K, K', K² and L³ are used for setting purposes. The coin slide J delivers at each operation first 3 pennies and then 2 pennies when either of the keys K, K', K², K³ or K⁴ is used for setting purposes.

The keys K, K', K², K³, K⁴, L, L', L² and L³ are mounted to swing on a rod A⁵ (see Figs. 2, 11, 12 and 13) attached to the sides of the casing A, and each of the said keys is pressed on by a spring L⁴ to normally hold the keys in uppermost position and to return the said keys to uppermost position after being pressed on and released. The forward portions of the keys K, K', K², K³, K⁴, L, L', L², L³ and N extend through slots A⁶ in front of the casing A to guide the keys and to limit their up and down motion.

The keys K, K', K², K³ and K⁴ are connected by links O with levers P, P', P², P³, P⁴ and P⁵ mounted to swing on a rod A⁷ attached to the sides of the casing A, and the said levers are adapted to engage lugs F', G', H', I', I², and J' fixed on the under sides of the coin slides F, G, H, I and J, respectively, to impart a rearward sliding motion to the said coin slides on pressing the keys. The links O are provided at their lower ends with slots O² engaged by pins O' on the keys K, K', K², K³ and K⁴ to allow return movement of the keys independent of the links O. The keys L, L', L² and L³ are similarly connected by links O³ with levers Q, Q', Q², Q³, and Q⁴ fulcrumed on a rod A⁸ attached to the sides of the casing A, and the said levers are adapted to engage lugs F², G², H², I³, I⁴ fixed or formed on the under sides of the coin slides F, G, H and I on pressing the corresponding keys. The levers Q² Q³ are rigidly connected with each other and always operate in unison, it being understood that the lever Q² operates the coin slide H for setting the same for the ejection of 2 dimes, while the lever Q³ is adapted to set the coin slide I for the ejection of 1 nickel, and the lever Q⁴ sets the coin slide I for the ejection of 2 nickels.

The levers P, P', P² P³, P⁴, P⁵, Q, Q', Q² Q³, and Q⁴ are in the form of bell crank levers so that on pressing the keys K, K', K², K³, K⁴, L, L', L² and L³ a rearward swinging motion is given to the long upwardly-extending members of the said bell crank levers by the action of the links O and O³ connecting the keys with the short downwardly-extending members of the said bell crank levers.

Each lever P, P', P² P³, and P⁴ is provided with an arm P⁶ (see Fig. 22) carrying a pin P⁷ engaging the top of an arm P⁸ held on the next following lever so that when the lever P is actuated it imparts a like motion to the next following lever P' which in turn carries along the lever P² P³, and the latter carries along the lever P⁴, and this lever P⁴ carries along the lever P⁵. Thus when the key K is pressed the several coin slides F, G, H, I and J are moved simultaneously rearward into set position, and when the key K' is pressed and the lever P' is actuated then the levers P² P³, P⁴ and P⁵ move with it in unison to move the slides G, H, I and J rearward. When the lever K² is pressed and the lever P² P³ is actuated then the levers P⁴ and P⁵ move with it in unison to move the slides H, I and J rearward. When the lever K³ is pressed and the lever P⁴ is actuated then the lever P⁵ moves with it in unison to move the slides I and J rearward. It is understood that the levers P³, P⁴ are close together and actuate the same coin slide I, and the levers P² P³ form a double lever and simultaneously actuate the coin slides H and I.

Each of the levers Q and Q' is provided with an arm Q⁵ having a pin Q⁶ engaging the under side of the next following lever Q² Q³, so that when the lever Q is actuated it imparts a like motion to the next following lever Q' which in turn carries along the levers Q² Q³ rigidly connected with each other, as previously mentioned. Thus when the key L is pressed the several coin slides F, G, H and I are moved simultaneously rearward into said position, and when the key L' is pressed the lever Q' is actuated and with it the lever Q² Q³ to move the slides G, H and I. When the key L² is pressed the two connected levers Q² Q³ are simultaneously actuated to move the coin slides H and I simultaneously rearward into set position.

The lugs on the coin slides and the positions and throws of the levers are arranged relatively to each other so that the coin slides F, G and J move all the way back when the corresponding keys are pressed. The dime coin slide H moves all the way back when the keys L, L', L² are pressed for setting the coin slide for the ejecting of two dimes at each operation, and the coin slide H moves only half way back when the keys K, K', K² are pressed for setting the said coin slide for the ejection of a single dime at one operation. The nickel coin slide I moves half way back when the keys L, L' and L² are pressed for setting the coin slide I for the ejection of a single nickel at each operation, and the said slide I moves all the way back when the keys K, K', K², K³ and L³ are pressed for setting the coin slide I for the ejection of two nickels at each operation.

Figure 3:
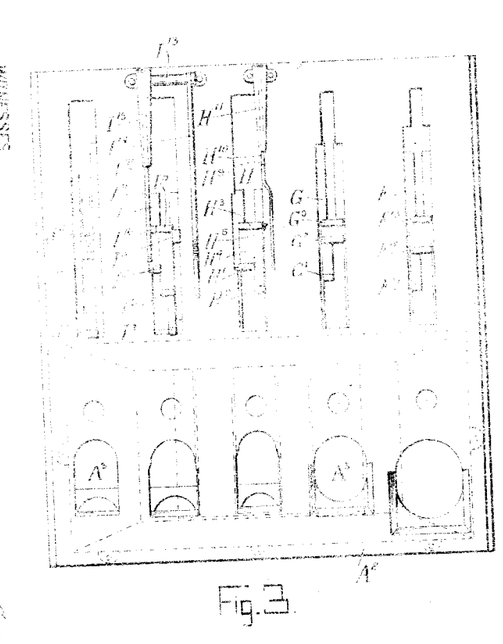
Fig. 3 is an inverted plan view of the under side of the casing top carrying the coin slides.

The coin slides F, G, H, I and J are provided at the under side (see Fig. 3) with lugs F³, G³, H³, I⁵ and J², respectively, adapted to be engaged by arms R, R' R², R³ and R⁴ secured to a shaft R⁵, and on the said shaft R⁴ is secured an arm R⁵ pivotally connected by a link R⁶ with an arm N' secured on the pivot or shaft N² of the lever N so that when the lever N is swung downward by the operator the shaft R⁴ is rocked and the arms R, R', R², R³ and R⁴ swing forward and engage the lugs F³, G³, H³, I⁵ and J² of the coin slides in set position at the time, and push the said set coin slides forward whereby the lowermost coins in the coin magazines, C, C', C², C² and C⁴ are removed and carried to the openings A³ to drop through the chute A⁴ into the tray B'. The ejecting lever N is returned to normal uppermost position after being pressed and released by the spring N³.

Each of the keys K, K', K², K³, K⁴, L, L', L² and L³ must be pressed downward to its full extent before the pressed key can return to upper normal position, and for this purpose the following arrangement is made: The rear end of the keys K, K', K², K³ and K⁴ are provided with hooks K⁵, and similar hooks $L^5$ are formed on the rear ends of the keys L, L', $L^2$ and $L^3$, and the said hooks $K^5$ and $L^5$ are adapted to engage a longitudinally-extending rod S held on arms S' secured to a shaft $S^2$ mounted to turn in suitable bearings arranged in the sides of the casing A. A spring $S^3$ is connected with one end of the casing A and at its other end to one of the arms S' to normally hold the rod S in lowermost position, that is, on top of the levers K, K', $K^2$, $K^3$, $K^4$, L, L', $L^2$, $L^3$ immediately in front of the hooks $K^5$ and $L^5$. On the right-hand side of the shaft $S^2$ is secured a segmental ratchet $S^4$ adapted to be engaged by a pawl T fulcrumed on a bracket T' attached to the right-hand side of the casing A. The pawl T is provided with a V-shaped heel $T^2$ adapted to be engaged on either face by a V-shaped head $T^3$ on the free end of a flat spring $T^4$ secured to the right-hand side of the casing A. The head $T^3$ is adapted to hold the pawl T in either of the two positions shown in Figs. 11 and 12. The lower end of the pawl T is adapted to be engaged by a hook-shaped cam $S^5$ formed on the lower end of the segmental ratchet $S^4$ to throw the pawl T from the position shown in Fig. 11 into the position shown in Fig. 12 at the time a key has been pressed. Now when the pressed key is released and returns to its normal uppermost position the ratchet $S^4$ swings downward and the lowermost end of the pawl T now engages the bottom tooth of the ratchet $S^4$ at a cut-out or mutilated portion $S^6$ thus locking the ratchet $S^4$, the rod S and the keys against upward swinging movement.

Figure 11:
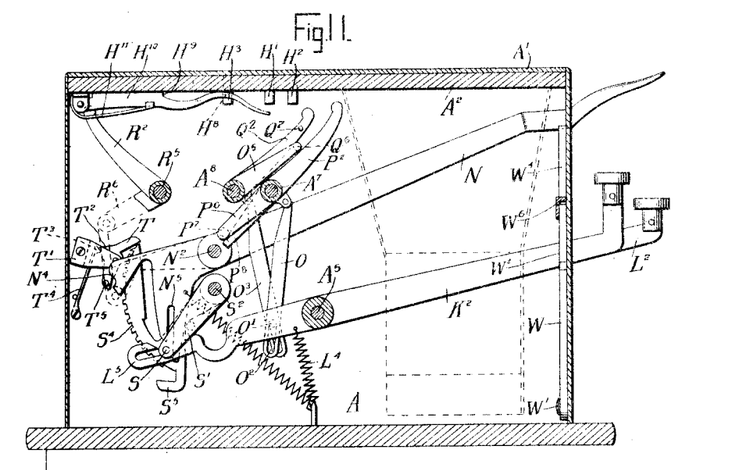
Fig. 11 is a cross section of the machine on the line 11—11 of Fig. 9.
Figure 12:
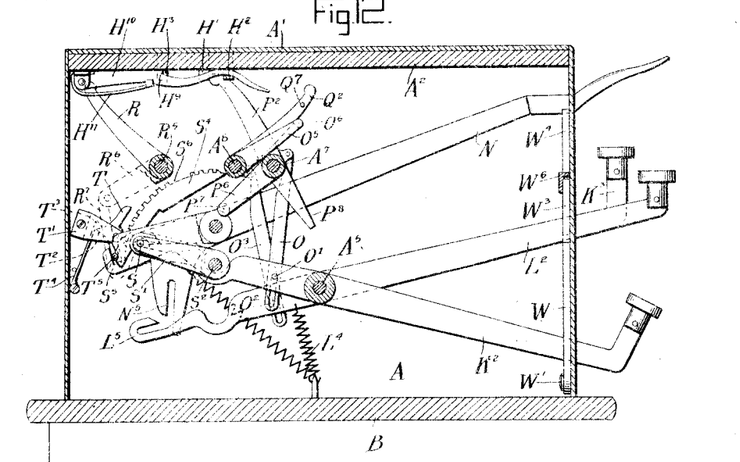
Fig. 12 is a similar view of the same with the 25-cent or quarter key for making change including pennies in pressed position.
Figure 13:
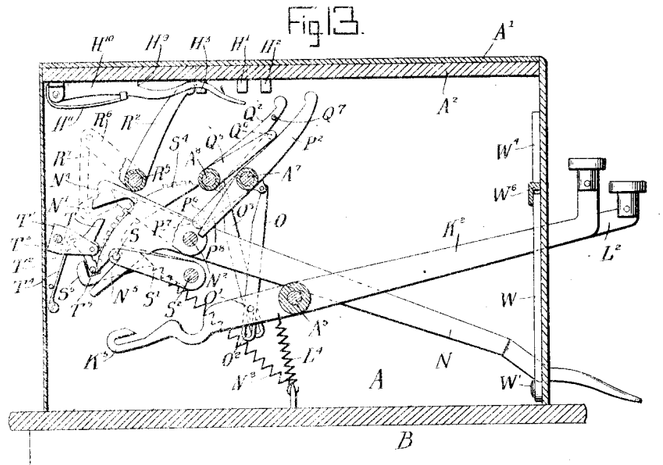
Fig. 13 is a similar view of the same with the ejecting key in pressed position for ejecting change of 25 cents including 5 pennies.

The lower end of the pawl T is provided with a sidewise extending pin $T^5$ adapted to be engaged by a cam $N^4$ formed on the rear end of the ejecting lever N to swing the pawl T from the position shown in Fig. 12 into the position shown in Fig. 11 when pressing the ejecting lever N downward so that the ratchet $S^4$ is unlocked. In order to return the pawl T to the previous position by the action of the cam $S^5$ it is necessary that the ratchet $S^4$ is swung upward during the downward movement of the ejecting key N, and after the ratchet $S^4$ has been unlocked by the pawl T. For this purpose the rear end of the ejecting lever N is provided with a fork $N^5$ adapted to engage the ratchet S at the time the latter is in lowermost position in front of the hooks $K^5$ and $L^5$ (see Fig. 2), and when the ejecting lever is pressed the ratchet $S^4$ is first unlocked by swinging the pawl T into unlocking position by the action of the cam $N^4$, as previously explained, and then the fork $N^5$ engages the rod S and swings the ratchet $S^4$ upward so that finally the cam $S^5$ engages the lower end of the pawl T and swings the same back into locking position. It is understood that when the ejecting lever N is in normal position the pin S is free to clear the fork N' whenever one of the setting keys is pressed, as above explained.

When one of the keys K, K', $K^2$, $K^3$, $K^4$, L, L', $L^2$, or $L^3$ is pressed and the ratchet $S^4$ is swung upward then the upper end of the pawl T is in engagement with the ratchet $S^4$ and glides over the teeth thereof but prevents upward movement of the pressed key should the latter be released previous to reaching its lowermost position. When the pressed key moves into lowermost position the cam $S^5$ engages the lower end of the pawl T and throws the pawl over to release the ratchet $S^4$, thus allowing the pressed key to return to uppermost position and to allow the ratchet $S^4$ to swing down to lowermost position. When the ejecting lever N is pressed a similar operation is repeated, that is, during the downward movement of the said lever N the upper end of the pawl glides over the ratchet wheel $S^4$, and should the lever N be stopped prior to reaching the end of its downward stroke the pawl T holds the ratchet $S^4$ against return movement and with it the lever N.

When a setting key has been pressed to the full extent and released and returned to uppermost position and the ratchet $S^4$ moved down to lowermost position the lower end of the pawl T glides over the ratchet $S^4$ during this downward movement of the ratchet so that the ratchet $S^4$ is locked against movement should another setting key be accidentally pressed by the operator. Now as the ratchet $S^4$ is held locked against upward movement the setting keys are locked against downward movement. The lever N when next pressed imparts a swinging motion to the pawl T by the cam $N^4$ to unlock the ratchet $S^4$ and to allow the key N to be swung downward.

From the foregoing it will be seen that either of the keys K, K', $K^2$, $K^3$, $K^4$, L, L', $L^2$, $L^3$ and N must be pressed all the way down before the operator is able to return the pressed key to uppermost position owing to the pawl T engaging the ratchet $S^4$, and another setting key cannot subsequently be pressed unless the ejecting lever N is first actuated to the full extent. Thus after a setting key is pressed and returned it is not possible to press another setting key, but the operator must actuate the ejecting lever N prior to pressing another setting key. By the arrangement described the operator must actuate the setting keys and the ejecting key to their full extent and in the proper order to work the machine.

The coin slides F and G are formed of single flat plates provided near their forward ends with openings $F^4$, $G^4$ for the reception of a half-dollar and a quarter-dollar, respectively, at the time the said slides F and G are moved rearwardly, and the said openings $F^4$, $G^4$ move into register with the corresponding coin magazines C and C'. The coin slides F and G are of a thickness corresponding to that of half-dollars and quarter-dollars so that only the lowermost coin of a corresponding stack of coins is accommodated at a time, that is, drops into the opening at the time the latter is in register with the coin magazine. The coin passing into the opening $F^4$ or $G^4$ rests on the plate $A^2$, and on the forward movement of the coin slide F or G such coin is carried forward over the plate $A^2$ until it drops through the opening $A^2$ into the chute $A^4$.

The dime coin slide H consists of two flat plates $H^4$ and $H^5$ (see Figs. 4, 5 and 6) of which the plate $H^4$ is provided at the front end with an opening $H^6$ adapted to register with the coin magazine $C^2$ at the time the coin slide H is moved all the way back into rearmost position. The plate $H^4$ is further provided in the rear of the opening $H^6$ with an opening $H^7$ into which fits the plate $H^5$ to slide independently of the plate $H^4$. The forward edge of the plate $H^5$ is a distance from the forward wall of the opening $H^7$ so as to form an opening or a pocket for the reception of a dime from the coin magazine $C^2$ at the time the coin slide H is moved half way back, the said pocket then registering with the coin magazine $C^2$ whereby only 1 dime is moved forward on the subsequent return or forward motion of the coin slide H. The plate $H^5$ is provided with the lug $H'$ adapted to be engaged by the lever $P^2$ for moving the coin slide H half way back as previously mentioned, and the plate $H^4$ is provided with the lug $H^2$ adapted to be engaged by the lever $Q^2$ for moving the coin slide H all the way back for setting the coin slide H so that on the forward movement thereof a dime is carried along in the opening $H^6$ and a second dime is subsequently carried along in the forward end of the opening $H^7$, the second dime being pushed along by the plate $H^5$. The rear end of the plate $H^4$ is provided with the lug $H^3$ adapted to be engaged by the lever $R^2$ for pushing the coin slide H forward.

In order to limit the rearward movement of the plate $H^4$ at the time the key K, K' or $K^2$ is pressed, the following arrangement is made: The lug $H^3$ (see Figs. 3 and 13) is provided with a pin $H^8$ extending sidewise and adapted to abut against a shoulder $H^9$ formed on an arm $H^{10}$ fulcrumed on the plate $A^2$ and pressed on by a spring $H^{11}$. Thus when the arm $H^{10}$ is in normal position and the plate $H^4$ is moved rearward into half way back position and the pin $H^8$ abuts against the shoulder $H^9$ to limit the rearward movement of the plate $H^4$. The spring-pressed arm $H^{10}$ is adapted to be engaged by pin $Q^7$ on the lever $Q^2$ to swing the arm $H^{10}$ downward to allow the coin slide plate $H^4$ to slide all the way back when the keys L, L' and $L^2$ are pressed.

The nickel slide I is similar in construction to the dime slide H and consists of two plates $I^6$, $I^7$, of which the plate $I^6$ is provided at its forward end with an opening $I^8$ adapted to register with the coin magazine $C^3$ at the time the coin slide I is moved all the way back into rearmost position. The plate $I^6$ is further provided in the rear of the opening $I^8$ with an opening $I^9$ into which fits the plate $I^7$ to slide independently of the plate $I^6$. The forward edge of the plate $I^7$ is a distance from the forward wall of the opening $I^9$ to form an opening or a pocket for the reception of a nickel from the coin magazine $C^3$ at the time the coin slide I is moved half way back, the said pocket then registering with the coin magazine $C^3$ whereby only 1 nickel is moved forward on the subsequent return or forward movement of the coin slide I.

Figure 4:
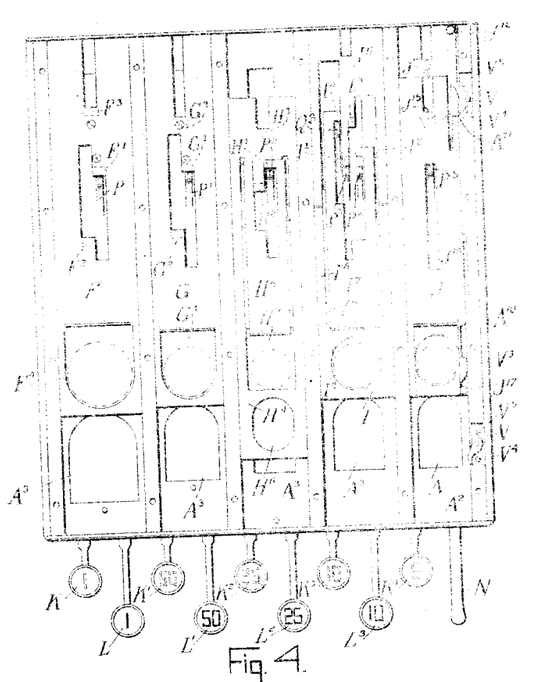
Fig. 4 is a plan view of the top of the casing, the coin slides and the keys for operating the same, the coin slides being in rearmost setting position for making $1.00 in change including pennies.
Figures 5, 6, 7:
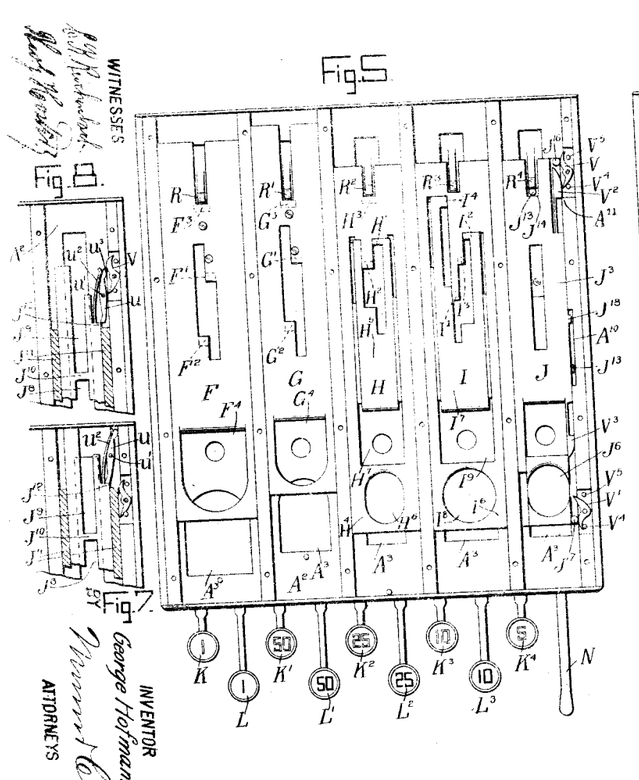
Fig. 5 is a similar view of the same with the coin slides partly returned after partly pressing the ejecting key downward.
Fig. 6 is a similar view of the same with the coin slides returned to normal position on the completion of the downward movement and return of the ejecting key.
Fig. 7 is a plan view of the locking and releasing device for periodically moving the bottom plate along with the middle plate of the penny coin slide, the middle plate being shown in section.
Figure 9:
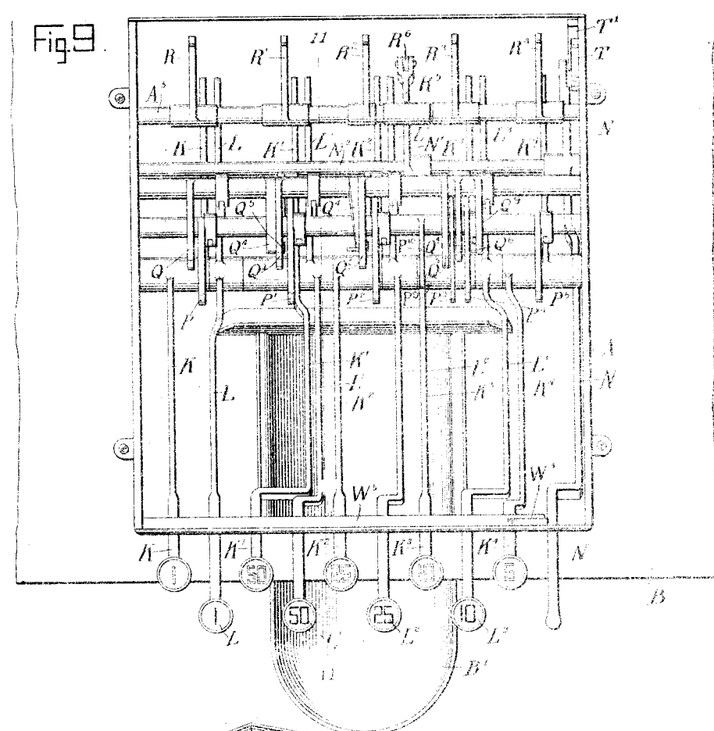
Fig. 9 is a plan view of the casing with the keys and key mechanisms and with the top of the casing and the coin slides removed.
Figure 10:
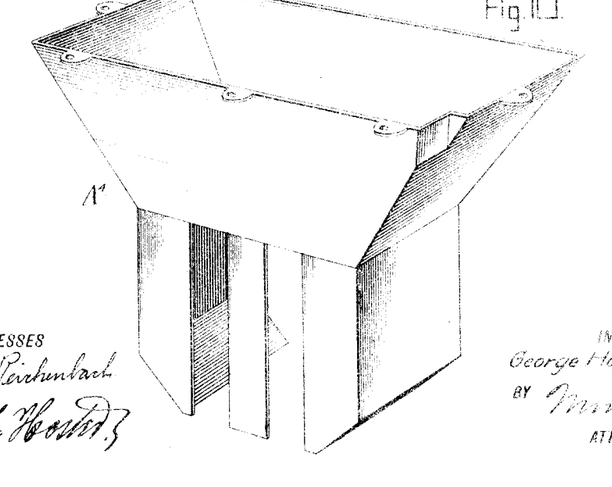
Fig. 10 is a perspective view of the gathering chute for the change.

The plate $I^6$ is provided with the lugs $I'$, $I^3$, $I^5$ previously mentioned. The lug $I'$ is adapted to be engaged by the lever $P^3$ for moving the coin slide I all the way back, as shown in Fig. 4. The lug $I^2$ is adapted to be engaged by the lever $P^4$ for moving the coin slide I half way back. The lug $I^4$ is adapted to be engaged by the lever $Q^3$ for moving the coin slide I the remaining half way back, and the lug $I^3$ is adapted to be engaged by the lever $Q^4$ for moving the coin slide I all the way back when the key $L^3$ is pressed. It is understood that when the coin slide I is moved half way back a nickel passes into the forward end of the opening $I^9$ to be pushed forward by the plate $I^7$ at the subsequent return or forward movement of the coin slide I, and when the coin slide I is all the way back then the opening $I^8$ is in register with the coin magazine $C^3$, and on the forward movement of the coin slide I this nickel is carried along in the opening $I^8$ and a second nickel subsequently passes into the forward end of the opening $I^9$ to be pushed along by the plate $I^7$ so that the two nickels are removed from the stack of nickels and drop through the opening $A^3$ to pass by way of the chute $A^4$ to the tray B'. It is understood that the lug $I^5$ on the plate $I^6$ is engaged by the lever $R^3$ for moving the coin slide I from set position (either half way back or all the way back) to forward position.

In order to limit the rearward movement of the plate $I^6$ at the time the key L, L', $L^2$ or $K^3$ is pressed, the following arrangement is made: The lug $I^5$ (see Figs. 3 and 24) is provided with a sidewise-extending pin $I^{10}$ adapted to abut against a shoulder $I^{11}$ formed on an arm $I^{12}$ secured on a pivot $I^{13}$ mounted to turn on the plate $A^2$. The pivot $I^{13}$ is provided with an arm $I^{14}$ extending forwardly under the plate A², and the arm I¹² and with it the arm I¹⁴ are pressed upward into normal position by a spring I¹⁵. The arm I¹² is adapted to be engaged by a pin Q⁸ on an arm Q⁹ forming part of the lever Q⁴ so that when the latter swings rearward the arm I¹² is swung downward against the tension of the spring I¹⁵ to allow the pin I¹⁰ to pass the shoulder I² so that the plate I⁶ can pass into extreme rearmost position at the time the lever L³ is pressed. The arm I¹⁴ is adapted to be engaged by a pin P⁹ held on an arm P¹⁰ forming parts of the levers P² P³ so that when the levers P² P³ are actuated the pin P⁹ swings the arm I¹⁴ downward and with it the arm I¹² to allow the pin I¹⁰ to pass the shoulder I² at the time the keys K, K′ and K² are pressed.

Figure 16:
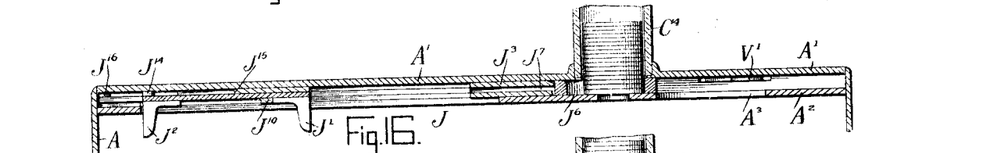
Fig. 16 is a transverse section of the penny slide in normal position.
Figures 17, 18, 19, 20, 21, 22, 23, 24:
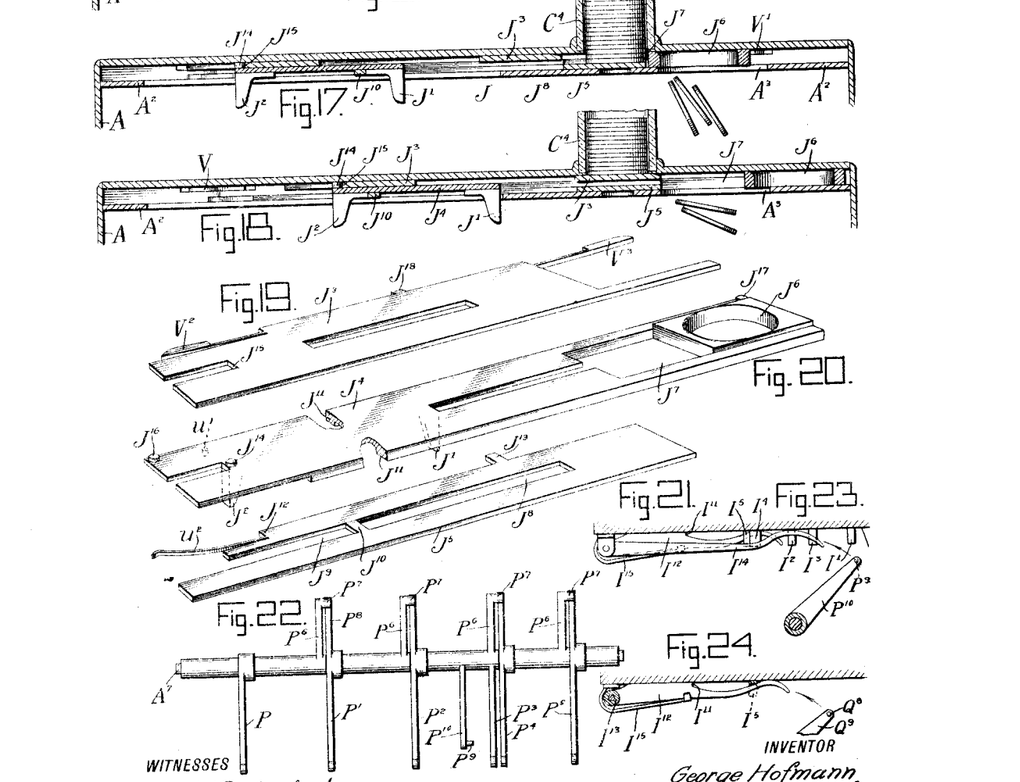
Fig. 17 is a similar view of the same in position when delivering three pennies.
Fig. 18 is a like view of the same when delivering two pennies.
Figs. 19, 20 and 21 are perspective views of the three members constituting the penny slide.
Fig. 22 is a plan view of the coin slide setting levers.
Figs. 23 and 24 are cross sections, showing more particularly the stopping devices for the dime and nickel actuating slides.

The penny coin slide J consists of three flat plates J³, J⁴, J⁵ (see Figs. 3, 4, 5, 16, 17, 18, 19, 20 and 21) placed one on top of the other so that the plate J⁵ rests on the plate A² while the rear portion of the plate J⁴ rests on the top of the plate J⁵ and the forward portion of the said plate J⁴ rests on the plate A². The plate J³ is superimposed on the plate J⁴. The middle plate J⁴ is provided with the two lugs J′ and J² previously mentioned, one of which the lug J′ is adapted to be engaged by the lever P⁵ while the lug J² is adapted to be engaged by the lever R⁴ for moving the slide J back into forward position. The forward end of the middle plate J⁴ is provided with an opening J⁶ of a depth corresponding to the aggregate height of three superimposed pennies so as to accommodate the three lowermost pennies in the stack of pennies contained in the coin magazine C¹ at the time the opening J⁶ is in register with the said coin magazine C (see Fig. 16). When the coin slide J is moved forward the three pennies contained in the opening J⁶ are carried along and drop through the opening A³, as indicated in Fig. 17. An opening J⁷ is arranged in the plate J⁴ in the rear of the opening J⁶ and this opening is adapted to be closed at the bottom by the forward end of the plate J⁵, so that the opening J⁷ is of a depth to accommodate two pennies, as indicated in Fig. 17, at the time the opening J⁷ is in register with the coin magazine C¹ and at the time the coin slide J has been moved half way back. On the next forward movement of the coin slide J the plate J³ moves with its forward end under the coin magazine C¹ and remains therein during the next return movement of the middle plate J⁴ so that the opening J⁷ is covered while moving into complete rearmost position to prevent filling of this opening J⁷ with two pennies during the full rearward movement of the coin slide. From the foregoing it will be seen that during the forward movement of the coin slide J three pennies are first carried along in the opening J⁶ and subsequently two pennies are carried along in the opening J⁷ so that five pennies pass into the tray B′ at each operation of the penny coin slide J.

The bottom plate J⁵ (see Fig. 21) is provided with slots J⁸, J⁹ for the passage of the lugs J′, J², and the said slots are separated by a cross bar J¹⁰ adapted to be engaged by the said lugs J′, J² of the middle plate J⁴ for periodically carrying the plate J⁵ along, as hereinafter more fully explained. The bottom of the plate J⁵ is somewhat narrower than the middle plate J⁴ and the latter is provided at the under side with guideways J¹¹ (see Figs. 7, 8 and 20) for the plate J⁵ to slide in. A pawl U is fulcrumed on the pin U′ depending from the middle plate J⁴ (see Figs. 7, 8 and 20) and the forward end of the said pawl U is adapted to engage a shoulder J¹² formed on the bottom plate J⁵ (see Figs. 7, 8 and 21). The rear end of the lever U is pressed outward by a spring U² secured or formed on the rear end of the plate J⁵ so as to swing the pawl U into engagement with the shoulder J¹². When the middle plate J⁴ moves forward its pin U′ carries the pawl U along, and as the pawl U engages the shoulder J¹² of the bottom plate J⁵ the latter is carried along by the middle plate J⁴. The rear end of the pawl U is adapted to engage the inclined shoulder U³ formed on the right-hand side of the plate A² (see Figs. 7 and 8) so that the pawl U is thrown out of engagement with the shoulder J¹² (see Fig. 8) at the time the middle plate J⁴ has reached the position shown in Fig. 17. The forward movement of the middle plate J⁴ now ceases until the lug J² engages the bar J¹⁰ and pushes the bottom plate J⁵ into its extreme forward position, as shown in Fig. 18. At this time a stop lug J¹³ on the right-hand side of the bottom plate J⁵ reaches the forward end of a slot A¹⁰ formed in the right-hand side of the plate A², as plainly indicated in Figs. 5, 6 and 7. When the middle plate J⁴ is moved rearward its lug J′ engages the cross bar J¹⁰ so that the bottom plate J⁵ is carried along to rearmost position.

Periodical movement is given to the upper plate J³ from the middle plate J⁴ in the following manner: The middle plate J⁴ is provided on top directly above the lug J² with a pin J¹⁴ adapted to engage a shoulder J¹⁵ on the rear end of the top plate J³ so that the middle plate J⁴ moves the top plate J³ forward at the time the middle plate J⁴ moves from rearward set position into forward position. The top plate J³ is moved backward only a distance far enough to move the forward portion of the plate J³ from under the coin magazine C¹ to open the bottom thereof to the opening J⁶. In order to limit the forward and backward sliding movement of the top plate J³ use is made of two levers V and V' pivoted on the right-hand side of the plate A² and controlled by pins J¹⁶ and J¹⁷ arranged on the rear and forward ends of the middle plate J⁴. The levers V and V' are adapted to engage spring catches V² and V³ secured to or formed on the right-hand side of the top plate J³, and the said catches V² and V³ are adapted to engage shoulders A¹¹ and A¹² arranged on the right-hand side of the plate A² (see Figs. 4, 5, 6, 7 and 8). The swinging movement of the levers V and V' is limited by stop pins V⁴, V⁵. When the plate J³ is in its forward position, the spring catch V³ engages the shoulder A¹² to hold the plate J³ against rearward movement during the time the middle plate J⁴ is moved rearward until the pin J¹⁷ of the middle plate J⁴ engages the lever V' so that the latter swings the spring catch V³ out of engagement with the shoulder A¹². At this time the inner wall of the opening J⁶ engages the forward edge of the plate J³ so that the latter is carried rearwardly with the plate J⁴. When the plates J², J³ reach the rearmost position (see Fig. 4) then the spring catch V² engages the shoulder A¹¹ to lock the top plate J³ against accidental forward movement. When the plate J⁴ is moved forward by the action of the lever R⁴ then the pin J¹⁶ engages the lever V to cause the latter to swing the spring catch V² out of engagement with the shoulder A¹¹ so that the top plate J³ is now unlocked and at this time the pin J¹⁴ engages the shoulder J¹⁵ so that the top plate J³ is carried along in a forward direction by the middle plate J⁴. The top plate J³ is provided at its right-hand side with a stop lug J¹⁸ extending into the notch A¹⁰ to limit the rearward and forward sliding movement of the said top plate. From the foregoing it will be seen that by the arrangement described the middle plate J⁴ receives rearward movement by the lever P⁵ engaging the lug J', and forward movement by the lever R⁴ engaging the lug J². Intermittent movement is given to the bottom plate J⁵ and to the top plate J³ from the middle plate J⁴, as above explained.

Figure 14:
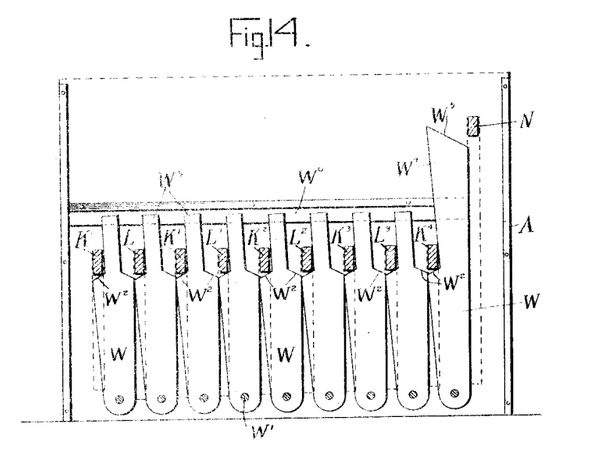
Fig. 14 is a sectional front elevation of the setting keys and the means for locking the ejecting keys against movement while pressing one of the setting keys.
Figure 15:
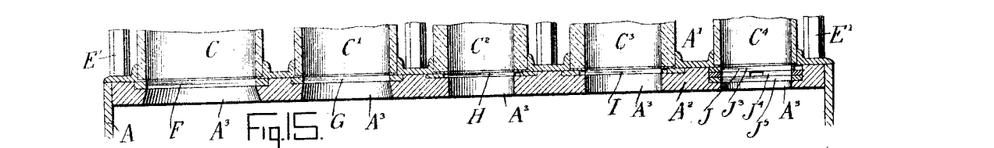
Fig. 15 is a sectional front elevation of the coin magazines, coin slides and their guideways.

The keys K, K', K², K³, K⁴, L, L', L², L³ and N are locked against movement during time any one of the said keys is pressed downward and returned to normal uppermost position. For this purpose use is made of a locking device, shown in detail in Fig. 14. A series of upwardly-extending arms W are arranged on the inner face of the front of the casing A, and the lower ends of the said arms W are pivoted at W' to the front of the casing A. The arms W are provided with inclined shoulders W² adapted to be engaged by the keys K, K', K², K³, K⁴, L, L', L², L³ and the said shoulders abut one against the other so that the arms W are free to swing to the right on pressing a key K, K', K², K³, K⁴, L, L', L² or L³. The arm W on the right-hand side is provided with an extension W⁴ having an inclined top W⁵ adapted to pass under the ejecting lever N. The arms W are provided with extensions W³ extending between adjacent setting keys with the exception of the arm W on the right end, the extension W⁴ of which is provided with an inclined top W⁵ adapted to pass under the ejecting key N. The upper ends of the extensions W³ are guided in a guide bar W⁶ attached to the rear face of the front of the casing, and the right-hand end of the said guide bar W⁶ forms a stop for the extension W⁴ of the right-hand arm W. When a key K, K', K², K³, K⁴, L, L', L² or L³ is pressed, the corresponding arms to the right of the key are swung to the right so that the arm W having the extension W⁴ swings under the ejecting lever N to prevent the same from being actuated, during the time one of the other keys is actuated. As the pressed setting key passes between adjacent arms W all the arms are held against further movement and hence the remaining non-pressed setting keys as well as the ejecting key are locked against downward movement. When the pressed key K, K', K², K³, K⁴, L, L', L² or L³ has returned to normal uppermost position the arms W are unlocked and the ejecting lever N can now be swung downward and in doing so it passes over the inclined top W⁵ thereby pushing the right-hand arm W to the left whereby a like swinging movement is given to the remaining arms, and all the arms are held locked in this position during the downward movement of the ejecting lever N as the latter travels on the outer edge of the right-hand arm W and consequently none of the keys K, K', K², K³, K⁴, L, L', L² and L³ can be pressed until the ejecting lever N has returned to normal uppermost position and has moved out of engagement with the right hand arm W.

The operation is as follows: For making change, including pennies, the corresponding key K, K', K², K³ or K⁴ is pressed so that the proper coin slides are moved rearwardly into set position, after which the pressed key is released and allowed to return to uppermost position by the return of its spring L⁴. The operator now swings the ejecting key N downward so as to actuate the several levers R, R', R², R³ and R⁴ to return the set coin slides to forward position, and in doing so to cause the actuated coin slides to push the coins out from under the coin magazines in the manner above described. When it is desired to make change without pennies then the corresponding key L, L', L² or L³ is pressed to set the corresponding coin slides F, G, H, and I, after which the key is released, and then the ejecting lever is swung downward to cause the corresponding slides to be pushed forward with a view to remove the corresponding coins from under the coin magazines.

When the operator desires to make change for $1.00, including pennies, then the operator presses the key K downward to the full extent so that the coin slides F, G, H, I and J are moved rearwardly, the coin slides F, G, I and J to the full extent and the slide H half way back. The operator next presses the ejecting lever N downward so that the several coin slides F, G, H, I and J are returned to normal position whereby the coin slide F moves 1 half-dollar from under the stack of coins in the coin magazine C, the slide G moves 1 quarter-dollar from under the stack of coins in the coin magazine C', the coin slide H moves a single dime from under the stack of coins in the coin magazine C², while the coin slide I moves successively 2 nickels from under the stack of nickels in the coin magazine C³ and the coin slide J moves successively three pennies and two pennies from under the stack of pennies contained in the coin magazine C⁴. When it is desired to make change for 50 cents, including pennies, the operator presses the setting key K' so that the coin slides G, I and J are moved all the way back to setting position while the coin slide H is moved half way back, and then the operator presses the ejecting lever N so as to return the coin slides G, H, I and J to normal forward position whereby the coin slide G ejects a quarter-dollar from under the stack of coins in the coin magazine C', the coin slide H ejects 1 dime, the coin slide I ejects 2 nickels and the coin slide J ejects 5 pennies in the same manner as above explained relative to the pressing of the key K. When it is desired to make change for 25 cents including pennies, the operator presses the key K² so that the coin slides I and J are moved all the way back while coin slide H is moved half way back, and then the operator presses the lever N so that the coin slides H, I and J are returned to normal position, and in doing so the coin slide H ejects 1 dime, the coin slide I ejects 2 nickels and the coin slide J ejects 5 pennies. When it is desired to make change for 10 cents including pennies, the operator presses the key K³ so that the coin slide I is moved half way back and the coin slide J all the way back, and then the operator presses the ejecting lever N so that the coin slides I and J are moved back to normal forward position and in doing so the coin slide I ejects 1 nickel and the coin slide J 5 pennies. When it is desired to make change for 5 cents, the keys K⁴ and N are pressed in succession to cause the slide J to eject 5 pennies.

When it is desired to make change for $1.00 without pennies, then the operator presses the key L so that the slides F, G and H move all the way back while the slide I is moved half way back, and then the operator presses the ejecting key N to return the coin slides F, G, H and I into forward position whereby the coin slide F ejects a half-dollar, the coin slide G ejects 1 quarter-dollar, the coin slide H ejects 2 dimes and the coin slide I ejects 1 nickel. For making change for 50 cents, the operator presses the setting key L' whereby the slides G and H are moved all the way back while the coin slide I is moved half way back, and then the operator presses the ejecting lever N to return the coin slides G, H and I to normal forward position, whereby the coin slide G ejects 1 quarter dollar, the slide H ejects 2 dimes and the coin slide I ejects 1 nickel. When it is desired to make change for 25 cents without pennies, the operator presses the setting key L² whereby the coin slide H is moved all the way back and the coin slide I half way back, and then the operator presses the ejecting key N to return the said coin slides H and I to forward position whereby the coin slide H ejects 2 dimes and the coin slide I ejects 1 nickel. When it is desired to make change for 10 cents without pennies, the operator presses the ejecting key L³ to move the slide I all the way back, and then the operator presses the ejecting key N to return the coin slide I to forward position, and in doing so the coin slide I ejects 2 nickels. Thus from the foregoing it will be seen that the operator in charge of the machine can quickly make change, with or without pennies, by pressing the corresponding series of keys K, K', K², K³, K⁴ or L, L', L², L³ for setting the slides, and pressing the lever N for ejecting purposes as set forth.

Having thus described my invention, I claim as new and desire to secure by Letters Patent.

1. In a change-making machine, a coin magazine adapted to contain a stack of coins, a coin slide movable under the said coin magazine and having two openings adapted to move successively into register with the said coin magazine, the coin slide being formed of two plates of which one is provided with two openings one in front of the other, the rear opening containing the other plate, a setting key for moving the said coin slide into set position for the successive removal of the two lowermost coins from the said stack of coins, and ejecting means for moving the set coin slide to successively eject the two lowermost coins from the said stack of coins.

2. In a change-making machine, a coin magazine adapted to contain a stack of coins, a coin slide movable under the said coin magazine and having two openings adapted to move successively into register with the said coin magazine, the said coin slide being formed of two plates of which one is provided with two openings one in front of the other, the rear opening containing the other plate, setting keys connected with the coin slide to move the latter in one direction until either opening is in register with the said coin magazine, and ejecting means connected with the coin slide for moving the latter in a reverse direction from either of the set positions to remove either one or two coins from under the stack of coins.

3. In a change-making machine, a coin magazine adapted to contain a stack of pennies, a coin slide movable under the stack of pennies and consisting of a plurality of superimposed plates, of which the middle plate is provided with openings arranged one in front of the other and adapted to move into register with the said coin magazine for receiving each a plurality of pennies, the bottom plate being adapted to close the rear opening and the top plate forming a cut-off for the pennies in the coin magazine, and means for moving the said plates.

4. In a change-making machine, a coin magazine adapted to contain a stack of coins, a coin slide movable under the said coin magazine and having two openings adapted to move successively into register with the said coin magazine, the said coin slide being formed of two plates, of which one is provided with two openings one in front of the other, the rear opening containing the other plate, setting keys connected with the said coin slide, one of the keys being adapted to move the said coin slide in one direction into set position with the rear opening in register with the said coin magazine, and the other key for moving the coin slide in the same direction into set position with the front opening in register with the said coin magazine, and an ejecting key connected with the said coin slide for moving the latter in a reverse direction from either of the said set positions to remove one or two coins from under the stack of coins.

5. In a change-making machine, a coin magazine adapted to contain a stack of coins, a coin slide movable under the said coin magazine and having two openings adapted to move successively into register with the said coin magazine, the said coin slide being formed of two plates, of which one is provided with two openings, one in front of the other, the rear opening containing the other plate, setting keys connected with the said coin slide, one of the keys being adapted to move the said coin slide in one direction into set position with the rear opening in register with the said coin magazine, and the other key for moving the coin slide in the same direction into set position with the front opening in register with the said coin magazine, an ejecting key connected with the said coin slide for moving the latter in a reverse direction from either of the set positions to remove one or two coins from under the stack of coins, and means for limiting the sliding movement of the coin slide into set position.

6. In a change-making machine, a coin magazine adapted to contain a stack of pennies, a coin slide movable under the said stack of coins and consisting of three superimposed plates, of which the middle plate is provided with openings arranged one in front of the other and adapted to move into register with the said coin magazine for receiving each a plurality of pennies, means for imparting movement to the middle plate, and means for periodically moving the top and bottom plates along with the said middle plate.

7. In a change-making machine, a coin magazine adapted to contain a stack of pennies, a coin slide movable under the said stack of coins and consisting of three superimposed plates, of which the middle plate is provided with openings arranged one in front of the other and adapted to move into register with the said coin magazine for receiving each a plurality of pennies, and the said bottom plate is adapted to move under the rear opening of the said middle plate to close the rear opening below the said coin magazine, and the top plate is adapted to move under the coin magazine to form a cut-off for the coins in the coin magazine, means for imparting movement to the said middle plate, and means for periodically moving the top and bottom plates along with the said middle plate.

8. In a change-making machine, a coin magazine adapted to contain a stack of pennies, a coin slide movable under the said stack of coins, and consisting of three superimposed plates, of which the middle plate is provided with openings arranged one in front of the other and adapted to move into register with the said coin magazine for receiving each a plurality of pennies, a setting key connected with the said middle plate for moving the said coin slide rearwardly into set position, an ejecting key connected with the said middle plate for moving the coin slide forward into ejecting position, and means connecting the said middle plate with the said top and bottom plates for moving the latter periodically along with the said middle-plate.

9. In a change-making machine, a coin magazine adapted to contain a stack of pennies, a coin slide movable under the said stack of coins and consisting of three superimposed plates, of which the middle plate is provided with openings arranged one in front of the other and adapted to move into register with the said coin magazine for receiving each a plurality of pennies, a setting key connected with the said middle plate for moving the said coin slide rearwardly into set position, an ejecting key connected with the said middle plate for moving the coin slide forward into ejecting position, means connecting the said middle plate with the said top and bottom plates for moving the latter periodically along with the said middle plate, and means for limiting the sliding movement of the said top and bottom plates.

10. In a change-making machine, a coin magazine adapted to contain a stack of pennies, a coin slide movable under the said stack of coins and consisting of three superimposed plates, of which the middle plate is provided with openings arranged one in front of the other and adapted to move into register with the said coin magazine for receiving each a plurality of pennies, and the said bottom plate is adapted to move under the rear opening of the said middle plate to close the rear opening below the said coin magazine, and the top plate is adapted to move under the coin magazine to form a cut off for the coins in the coin magazine, spaced lugs on the said middle plate, levers adapted to engage the said lugs, a setting key connected with one of the said levers, for moving the middle plate of the coin slide into set position, an ejecting key connected with the other lever for moving the middle plate of the coin slide into ejecting position, and means connecting the said middle plate with the said top and bottom plates to carry the latter periodically along with the middle plates.

11. In a change-making machine, a series of coin magazines adapted to contain stacks of coins of different denominations, a series of coin slides operating under the said magazines for removing the lowermost coins from under the stacks of coins, a series of setting keys, a series of actuating levers adapted to engage the said coin slides to move the same rearward into setting position, links connecting the said setting keys with the said actuating levers, means adapted to connect the said actuating keys with each other, an ejecting key, and a second set of series of actuating levers connected with the said ejecting key and adapted to engage the said coin slides to return the set coin slides to normal position, the said coin slides during their return movement ejecting the lowermost coins from the coin magazine.

In testimony whereof I have signed my name to this specification in the presence of two subscribing witnesses.

GEORGE HOFMANN.

Witnesses:
ALBERT BELANGER,
ARTHUR H. BRIGGS.